United States Patent
Iwasaki et al.

(10) Patent No.: US 12,022,841 B2
(45) Date of Patent: Jul. 2, 2024

(54) FILM FOR PRESERVING EDIBLE MEAT

(71) Applicant: Toyo Aluminium Kabushiki Kaisha, Osaka (JP)

(72) Inventors: Keisuke Iwasaki, Osaka (JP); Tetsuya Matsui, Osaka (JP); Hiroshi Izumida, Osaka (JP); Masakazu Uematsu, Osaka (JP); Masayoshi Nakayama, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 683 days.

(21) Appl. No.: 17/059,347

(22) PCT Filed: May 27, 2019

(86) PCT No.: PCT/JP2019/020890
§ 371 (c)(1),
(2) Date: Jan. 12, 2021

(87) PCT Pub. No.: WO2019/230648
PCT Pub. Date: Dec. 5, 2019

(65) Prior Publication Data
US 2021/0161162 A1 Jun. 3, 2021

(30) Foreign Application Priority Data

May 29, 2018 (JP) .................. 2018-102830
Dec. 14, 2018 (JP) .................. 2018-234855

(51) Int. Cl.
| | |
|---|---|
| A23B 4/24 | (2006.01) |
| A23B 4/16 | (2006.01) |
| A23B 4/20 | (2006.01) |
| A23L 3/3409 | (2006.01) |
| A23L 3/3463 | (2006.01) |
| A23L 3/358 | (2006.01) |
| A23L 13/00 | (2016.01) |
| C01B 3/06 | (2006.01) |
| C08J 5/18 | (2006.01) |
| C08K 3/12 | (2006.01) |

(52) U.S. Cl.
CPC .......... *A23B 4/24* (2013.01); *A23B 4/16* (2013.01); *A23B 4/20* (2013.01); *A23L 3/3409* (2013.01); *A23L 3/3463* (2013.01); *A23L 3/358* (2013.01); *A23L 13/00* (2016.08); *C01B 3/065* (2013.01); *C08J 5/18* (2013.01); *C08K 3/12* (2013.01); *C08J 2323/06* (2013.01); *C08J 2323/12* (2013.01)

(58) Field of Classification Search
None
See application file for complete search history.

(56) References Cited

U.S. PATENT DOCUMENTS

| | | | |
|---|---|---|---|
| 3,419,400 A | 12/1968 | Hayhurst et al. | |
| 2007/0275134 A1 | 11/2007 | Siegel et al. | |
| 2013/0323129 A1* | 12/2013 | Carmichael | B65B 31/04 422/162 |
| 2016/0058021 A1 | 3/2016 | Schmidt et al. | |

FOREIGN PATENT DOCUMENTS

| | | |
|---|---|---|
| JP | H04-330246 A | 11/1992 |
| JP | H05-207864 A | 8/1993 |
| JP | H05-268925 A | 10/1993 |
| JP | H06-343458 A | 12/1994 |
| JP | 2000-246843 A | 9/2000 |
| JP | 2007-531672 A | 11/2007 |
| JP | 2009-77651 A | 4/2009 |
| JP | 201495048 * | 5/2014 |
| JP | 2017-147950 A | 8/2017 |
| WO | WO2015093184 * | 6/2015 |

OTHER PUBLICATIONS

Machine translation of WO2015093184 (Year: 2015).*
Machine translation of JP 201495048 (Year: 2014).*
"The world of aluminum foil that contributes to society, Application of aluminum foil to 'chilled maturation'" Jan. 4, 2015 (cited in the ISR).
International Search Report dated Aug. 20, 2019, issued for PCT/JP2019/020890.

* cited by examiner

*Primary Examiner* — Robert T Butcher
(74) *Attorney, Agent, or Firm* — Locke Lord LLP (57) ABSTRACT

[Problem] To provide: a film which is for aging meat and which is relatively easy to treat and allows meat to be aged more safely and effectively; and a film which is for preserving meat and can effectively suppress the deterioration of color or the like of fresh meat.

[Solution] The present invention relates to a film for preserving meat, the film being characterized by: (1) including a hydrogen generating layer containing hydrogen generating particles which can generate a molecular hydrogen upon reacting with water; and (2) using the film in a state in which the hydrogen generating layer is directly contacted with the surface of the meat.

10 Claims, 4 Drawing Sheets

FILM FOR PRESERVING EDIBLE MEAT

TECHNICAL FIELD

The present invention relates to a film used for preserving meat. In addition, the present invention relates to a film used for aging meat.

BACKGROUND ART

Meat such as beef, pork, and chicken is processed to a predetermined size, then packaged with a film or a sheet (hereinafter both are collectively referred to as a "film") in order to prevent contamination and the like, then transported, and preserved as necessary, and then delivered to consumers.

Incidentally, it is generally known that the color of meat changes over time. Therefore, even when meat has a level of quality at which it can be safely eaten, it may be determined that meat has deteriorated just because the color of the meat changes and the meat is often discarded in such cases. In order to reduce loss due to such waste, for example, it is important to prevent the color of meat from changing and keep the appearance of the meat fresh.

The color of meat is mainly based on the color of myoglobin contained in the meat. Reduced myoglobin in meat is oxidized and changed to oxymyoglobin, and thus a bright red color is exhibited, and further oxidation proceeds to produce brown metmyoglobin, and as a result, the color changes from red to brown. In order to prevent such a change in color of meat, in addition to a coloring agent such as nitrite, an antioxidant such as synthetic ascorbic acid is generally used. However, nitrite may generate nitrosamine, which may have carcinogenic bioactivity. Synthetic ascorbic acid may cause diarrhea and the like when taken in a large amount. In order to address these problems, for example, a method of preventing the color of meat from changing using transglutaminase which is safe for the human body has been proposed (Patent Document 1).

On the other hand, there is also a need to preserve the freshness of meat and improve the Umami of meat. Aging of meat such as beef and pork has been conventionally performed in the meat industry, and various products have been provided accordingly. When meat is aged, the structure of myofibrils becomes weak due to enzymes (protease, etc.) in the meat and thus the meat quality can be softened. In addition, as a result of decomposition of proteins in meat, Umami (one kind of deliciousness or food taste) components such as amino acid can be generated. As a result, compared with meat before aging, it is possible to improve taste, fragrance (flavor), texture, and the like. Therefore, with the diversification of consumer tastes, consumer demands for aged meat are increasing.

Regarding such an meat aging method, a) wet aging in which vacuum-packed block meat is left in a refrigerator for 2 weeks to 1 month and b) dry aging in which block meat hangs in a dried refrigerator for 2 weeks to 2 months and the like are known, and aging is performed according to one method or two or more thereof in combination.

On the other hand, in recent years, in order to further promote aging, aging techniques that actively utilize microorganisms have been developed. For example, an meat aging and softening method in which specific microorganisms are applied and grown on meat and the meat is aged and softened is known (Patent Document 2).

In addition, for example, an aged meat production method including a process of wrapping meat with meat aging cloth including specific microorganisms has been proposed (Patent Document 3).

CITATION LIST

Patent Documents

[Patent Document 1] Japanese Patent Application Publication No. H5-207864
[Patent Document 2] Japanese Patent Application Publication No. H6-343458
[Patent Document 3] Japanese Patent Application Publication No. 2017-147950

SUMMARY OF INVENTION

Technical Problem

However, in any case of freshness preserving and aging, there is room for further improvement in the related art.

Regarding freshness preserving, for example, in Patent Document 1, although transglutaminase is added to meat, transglutaminase is difficult to handle because it is an enzyme, and thus there is a risk of transglutaminase being inactivated during transportation, storage, processing, and the like before use. In addition, during use, since unevenness occurs in the procedure of adding transglutaminase, for example, it is difficult to uniformly prevent the color of the entire surface of meat from changing.

Regarding aging, in the related art as in Patent Document 2 and Patent Document 3, it is difficult to maintain a stable growth environment for microorganisms used for aging. For example, when cloth containing microorganisms and the like is distributed, there is a risk of the microorganisms dying under a high temperature or low humidity condition. On the other hand, microorganisms grow too much under preferable conditions for survival of microorganisms, and thus there is a risk of the cloth itself becoming severely moldy. If meat is aged using such a material, there is a risk of the meat actually deteriorating and becoming toxic. Moreover, sheets containing microorganisms also have hygiene problems when handled in ordinary households and the like.

In addition, since aging is generally performed over a certain time, all aged meats are inevitably brown, and aged meats produced in the related art also similarly exhibit a brown color. This makes it look bad, and some consumers are not willing to buy it simply due to its color.

Here, a main object of the present invention is to provide a film for preserving meat which is relatively easy to handle and allows meat to be aged more safely and effectively. Another object of the present invention is to provide a film for preserving meat which can effectively inhibit deterioration of the freshness of meat.

Solution to Problem

The inventors conducted extensive studies in order to address problems in the related art, and as a result, found that a film having a specific structure can achieve the above object, and completed the present invention.

Specifically, the present invention relates to the following film for preserving meat.

1. A film for preserving meat, wherein (1) the film includes a hydrogen-generating layer containing hydrogen-generating particles capable of generating molecular hydrogen upon reacting with water, and wherein (2) the film is used such that which the hydrogen-generating layer is in direct contact with a surface of meat.
2. The film for preserving meat according to the item 1, wherein the hydrogen-generating layer has a structure in which the hydrogen-generating particles are dispersed in a matrix containing a polymer material.
3. The film for preserving meat according to the item 1, wherein at least the surface of hydrogen-generating particles protruding outward from the surface of the hydrogen-generating layer is covered with a coating layer containing a coating resin.
4. The film for preserving meat according to the item 2, wherein the polymer material is at least one of polyethylene, polypropylene, a styrol resin, a vinyl chloride resin, polyethylene terephthalate, a polyamide resin, a urethane resin, a fluororesin, a modified fluororesin, an epoxy resin, starch, cellulose, nylon, polyethylene glycol and polyethylene oxide.
5. The film for preserving meat according to the item 1, wherein the hydrogen-generating particles are at least one of magnesium hydride, calcium hydride, barium hydride, beryllium hydride, strontium hydride, lithium hydride, sodium hydride, sodium borohydride, lithium/sodium hydride, silicon hydride, magnesium, aluminum, a magnesium alloy and an aluminum alloy.
6. The film for preserving meat according to the item 1, wherein the volume average particle diameter of the hydrogen-generating particles is 1 to 100 μm.
7. The film for preserving meat according to the item 1, which is used for aging the meat.
8. The film for preserving meat according to the item 1, which is used to preserve freshness of the meat.
9. A method of producing aged meat, including (1) a step of adhering a film for preserving meat according to the item 1 to the meat so that a hydrogen-generating layer of the film is in direct contact with a surface of the meat; and (2) a step of aging the meat to which the film is adhered at a temperature of 5° C. or lower to obtain aged meat.
10. The production method according to the item 9, wherein at least the step (2) is performed in an atmosphere in which the outside air is blocked.

Advantageous Effects of Invention

According to the present invention, it is possible to provide a film for preserving meat which is relatively easy to handle and allows meat to be aged more safely and effectively. Moreover, in the present invention, it is possible to provide a film for preserving meat which can effectively inhibit deterioration of the freshness of meat.

In particular, in the film of the present invention, since hydrogen-generating particles are used as an active component, unlike a conventional method of actively using microorganisms or enzymes, it is easy to handle meat (dressed meat, etc.) when it is distributed and used, and meat can be aged while avoiding hygiene problems.

Moreover, since hydrogen-generating particles can supply molecular hydrogen to meat, it is possible to inhibit oxidation of fatty acids, putrefaction, and the like in meat due to an antioxidative effect of molecular hydrogen and protect a series of reactions in which proteins in meat are decomposed into amino acids from external inhibition components.

In this manner, since the film of the present invention can supply molecular hydrogen into meat upon reacting with water, it can inhibit oxidation of fatty acids in meat, decomposition of amino acids, and the like, inhibit deterioration in the meat quality and promote aging of meat.

In addition, as described above, since hydrogen-generating particles are used as an active component in the film of the present invention, deterioration of meat can be delayed, and thus the freshness can be maintained more effectively. Preserving freshness as used in the present invention means minimizing (delaying) at least one of deterioration (browning) of a color or fat oxidation. Therefore, for example, it is possible to effectively inhibit deterioration (particularly browning) of pigment components contained in meat over time. That is, regardless of whether it is aged or not, when the film of the present invention is adhered to the surface of meat, it is possible to effectively maintain the fresh color (particularly red) of meat. In addition, for example, since oxidation of fat content contained in meat can be delayed, original flavor and the like of fresh meat can be maintained for a longer time.

In the film of the present invention, the reason why the above effects are obtained is not clear, but it is considered to be due to the following mechanism of action. However, the following mechanism includes aspects that can be assumed from known academic knowledge, and the present invention is not necessarily limited to a film for aging meat using the mechanism.

(1) Inhibition of Color Change

Myoglobin, which is a chromoprotein and exhibits a purplish red color, has divalent heme iron, and when oxygen is coordinated with this, the myoglobin becomes bright red oxymyoglobin. In addition, when divalent heme iron of oxymyoglobin is oxidized with oxygen, brown metmyoglobin is produced. In this case, when the film of the present invention is brought into contact with meat, since it is possible to supply molecular hydrogen into the meat, it is possible to reduce oxygen in the meat, and it is possible to effectively inhibit an oxidation reaction in which brown metmyoglobin is produced from purplish red myoglobin, an oxidation reaction in which brown metmyoglobin is produced from bright red oxymyoglobin, and the like.

(2) Promotion of Proteolysis

The film of the present invention can supply molecular hydrogen into meat by reacting with water, and thus can reduce hydroxyl radicals in the meat and protect a reaction of proteolytic enzymes. When a proteolytic enzyme reaction is protected from reaction inhibition components, it is possible to promote proteolysis of meat, increase the amount of peptides, and additionally, increase the amount of amino acids such as glutamic acid and inosinic acid, and increase the Umami of the meat.

Generally, hydrogen peroxide is produced in cells during energy metabolism, and iron ions act on superoxide ($O_2.-$) or the above hydrogen peroxide in oxidoreductase complexes such as mitochondria to form hydroxyl radicals (.OH or ONOO—). Hydrogen peroxide also exhibits an oxidation action, but it is particularly known that hydroxyl radicals have a short lifespan, but have very strong oxidizing power, and cause oxidation of proteins, lipids, nucleic acids, and the like in living organisms (Biomedical Gerontology "Oxidative protein modification and aging" 35(3); 17-22.2011). In living organisms, it is general to inhibit such oxidation with an antioxidant substance such as vitamin C. However, since new antioxidant substances such as vitamin C are not newly produced in meat, if hydrogen peroxide or hydroxyl radical remains in the meat, there is a risk of proteins, lipids, nucleic acids and the like in the meat being oxidized. In other words, there is a concern that hydroxyl radicals remaining in the meat will also act on enzymes which are a type of protein to inactivate them. Such enzymes also include proteolytic enzymes. Therefore, there is a risk of proteolytic enzymes being inactivated due to influence of hydrogen peroxide or hydroxyl radicals remaining in meat and sufficient proteolysis not proceeding.

On the other hand, it is known that molecular hydrogen reduces hydroxyl radicals (Ohsawa et al. Nat Med 2007). In the film for preserving meat of the present invention, since the film can supply molecular hydrogen into meat, such hydrogen peroxide or hydroxyl radicals are reduced, and thus inactivation of enzymes can be prevented, and a reaction of proteolytic enzymes is protected so that aging of the meat can be promoted.

(3) Inhibition of Oxidation of Fatty Acids

When molecular hydrogen is supplied into meat upon reacting with water, it is possible to inhibit deterioration of fatty acids (oils and fats) of the meat. Specifically, oils and fats in meat contain unsaturated fatty acids (RH), and a dehydrogenation reaction occurs due to external influences such as light and heat, and thereby fatty acid radicals (R.) are formed. In addition, when oxidation occurs due to oxygen in the outside air, peroxy radicals (ROO.) are formed to produce hydroperoxide (ROOH). Generally, these peroxides are reduced due to vitamin E as an antioxidant in living organisms and return to unsaturated fatty acids or fatty acid radicals, and additionally, vitamin E is reduced by vitamin C and regenerated. However, since vitamin E, vitamin C, and the like are not newly produced in the meat state, they are depleted. Thereby, generated peroxy radicals react with other fatty acid radicals to generate hydroperoxide and fatty acid radicals, and peroxide formation of fatty acids proceeds in a chain reaction. Thus, a reaction between fatty acid radicals generated in large amounts (R.+R.→R—R), a reaction between fatty acid radicals and peroxy radicals (R.+ROO.→ROOR), a reaction between peroxy radicals (ROO.+ROO.→ROOR+$O_2$), and the like occur. Such peroxides change the color, odor, viscosity, and the like of oils and fats, and as a result, taste and the like may be degraded. Moreover, polymers or decomposition products generated in these reactions contain aldehydes and ketones which adversely affect the human body. In this manner, oxidation of fatty acids in meat is synonymous with deterioration of quality of the meat.

In contrast, the film for preserving meat of the present invention can supply molecular hydrogen to meat. It has been frequently reported that molecular hydrogen exhibits an antioxidative effect and can also prevent the above fatty acid oxidation reaction. For example, it is thought that molecular hydrogen as a substitute for vitamin E reduces peroxide to return to fatty acids or fatty acid radicals, molecular hydrogen as a substitute for vitamin E regenerates vitamin E, and as a result, peroxide is reduced to return to fatty acids or fatty acid radicals. Therefore, the film for preserving meat of the present invention provides molecular hydrogen into meat upon reacting with water, and thus can inhibit deterioration of fatty acids (oils and fats) of the meat. As a result, according to the present invention, it is possible to preserve the freshness of fats and thus it is possible to contribute to maintaining the flavor of meat. For example, it is possible to maintain an acid value of 0.35 or less even after aging as in examples to be described below.

(4) Inhibition of Putrefaction

As aging of meat proceeds, proteins are decomposed into amino acids and aging proceeds, but if it remains unchanged, it leads to putrefaction. That is, eventually, amino acids are also decomposed to generate ammonia. The state in which ammonia odor is generated is determined as putrefaction and generation of hydrogen sulfide and the like is generally observed. If a large amount of these is ingested, since it adversely affects the human body, meat with strong ammonia odor is considered unsuitable for food.

For example, glutamic acid, which is a Umami component, is converted into 2-iminoglutaric acid (+NADH and H+) due to an enzyme glutamate dehydrogenase (GDH) present in meat and in cells of microorganisms and coenzyme nicotinamide adenine dinucleotide (NAD+) and also generates 2-oxoglutaric acid and $NH_4^+$ due to a dehydration reaction. This is also called an oxidative deamination, that is, a process of decomposing glutamic acid to ammonia.

On the other hand, in the present invention, since molecular hydrogen having an antioxidative effect is supplied to meat, the reaction with coenzyme nicotinamide adenine dinucleotide is inhibited. Namely, additional decomposition of amino acids can be prevented by molecular hydrogen.

In addition, it is known that methionine, which is one amino acid contained in meat, is converted into methanethiol (methyl mercaptan) through a reaction according to oxidative deamination with bacteria in nature, and generates bad odor like rotten eggs. Particularly, it is said that methionine is easily oxidized among amino acids. On the other hand, in the present invention, since molecular hydrogen having an antioxidative effect is supplied to meat, a reaction resulting from oxidation can be inhibited and production of methanethiol can be inhibited. That is, it is possible to inhibit further decomposition of amino acids due to molecular hydrogen.

BRIEF DESCRIPTION OF DRAWINGS

FIG. 4(*a*)—(*i*) show diagrams of results obtained by observing an appearance of aged meats obtained in examples and comparative examples. FIG. 4(*a*) shows Example 1, FIG. 4(*b*) shows Example 2, FIG. 4(*c*) shows Example 3, FIG. 4(*d*) shows Example 4, FIG. 4(*e*) shows Comparative Example 1, FIG. 4(*f*) shows Comparative Example 2, FIG. 4(*g*) shows Comparative Example 3, FIG. 4(*h*) shows Comparative Example 4, and FIG. 4(*i*) shows Comparative Example 5.

DESCRIPTION OF EMBODIMENT(S)

1. Film for Preserving Meat

The film for preserving meat of the present invention (the film of the present invention) is a film for preserving meat, (1) wherein a hydrogen-generating layer containing hydrogen-generating particles which can generate molecular hydrogen upon reacting with water, (2) wherein the film of which the hydrogen-generating layer is in direct contact with a surface of meat is used.

Basic Configuration of Film

As described above, the film of the present invention includes a hydrogen-generating layer, and the film is used so that the hydrogen-generating layer is in direct contact with meat. Thereby, for example, water supplied from the meat reacts with hydrogen-generating particles in the hydrogen-generating layer and generates hydrogen, and thus can contribute to aging of the meat and the like. In this case, as long as it is a form including the hydrogen-generating layer, the layer structure, the material, and the like are not particularly limited.

Here, the film in the present invention is not limited to the film having a thickness of less than 250 μm defined in Japanese Industrial Standards (JIS) and includes a sheet having a thickness of 250 μm or more.

Therefore, as the film of the present invention, in addition to a film composed of a single hydrogen-generating layer, for example, a film including hydrogen-generating particles inside and/or on the surface of a base film including at least one of a metal foil, a metal vapor-deposited film, a polymer material film (a resin film, etc.), paper, cloth and a non-woven fabric can be employed.

Regarding the structure in which the hydrogen-generating particles are contained on the surface of the base film, the structure can be formed according to, for example, a) a method of directly fixing and laminating the hydrogen-generating particles on the surface of the base film, b) a method of applying a coating liquid containing the hydrogen-generating particles (for example, a dispersion liquid in which the hydrogen-generating particles are dispersed in a solvent) to the surface of the base film, or the like. Thereby, a laminate of "base film/hydrogen-generating layer" can be obtained.

Regarding the structure in which the hydrogen-generating particles are contained inside the base film, the structure can be obtained according to, for example, a) a method of molding a molten product of a mixture containing a polymer material and the hydrogen-generating particles into a film, b) a method of molding a mixed liquid containing a polymer material solution and the hydrogen-generating particles into a film, or the like. Thereby, it is possible to form a hydrogen-generating layer (single layer) in which the hydrogen-generating particles are dispersed in a matrix containing a high-molecular compound.

Figure 1:
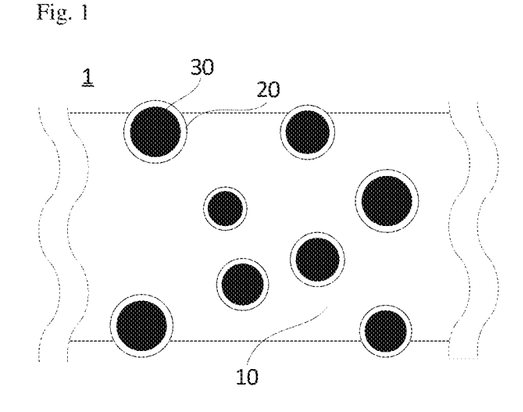
FIG. 1 is an image diagram of a cross-sectional structure of a film for preserving meat of the present invention.
Figure 5:
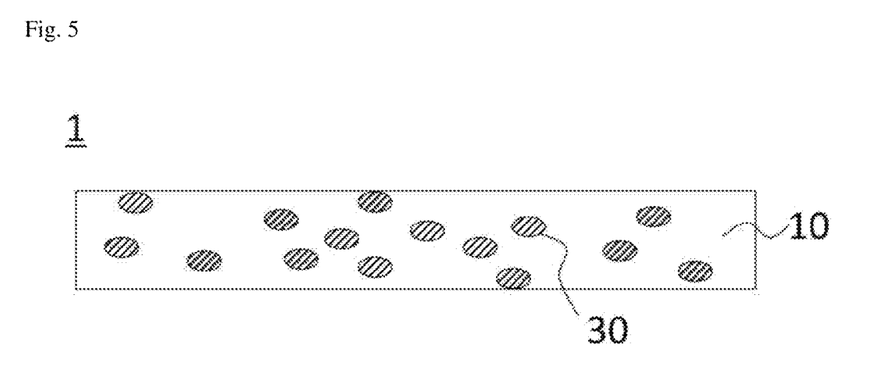
FIG. 5 is an image diagram of a cross-sectional structure of a film for preserving meat of the present invention.

Among these forms, it is desirable to use a hydrogen-generating layer in which the hydrogen-generating particles are dispersed in a matrix containing a polymer material because aging can be performed more effectively and safely. FIG. 1 and FIG. 5 show an image diagram of a cross-sectional structure of an example according to an embodiment of such a film of the present invention.

Figure 2:
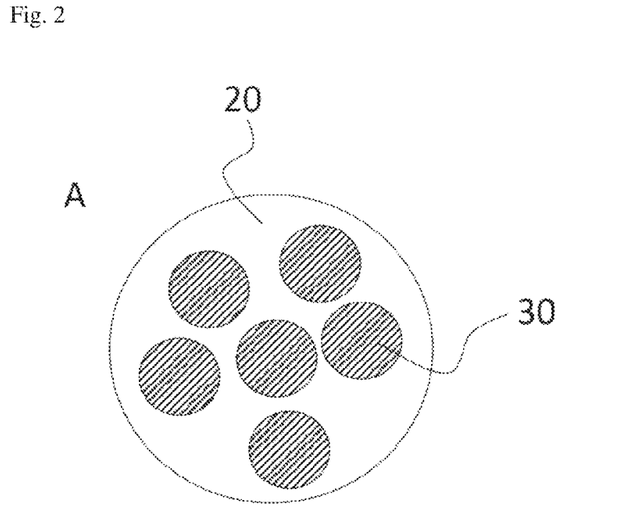
FIG. 2 is an image diagram showing a structure in which a plurality of hydrogen-generating particles are contained in a coating resin.

A film 1 of FIG. 1 is composed of a single hydrogen-generating layer having a structure in which the hydrogen-generating particles 30 are dispersed in a matrix 10 containing a polymer material. The film has a structure in which the surface of one hydrogen-generating particle 30 is covered with a coating layer 20 containing a coating resin. As another structure, as shown in FIG. 2, a structure (a so-called compound form) in which the plurality of hydrogen-generating particles 30 are contained in the coating layer 20 containing a coating resin may be used, and the plurality of hydrogen-generating particles 30 may be contained in the hydrogen-generating layer in that state. In addition, in any case, the coating layer may contain other resins (for example, a polymer material constituting the matrix 10) and the like as long as they do not substantially adversely affect the advantages of the present invention.

Figure 3:
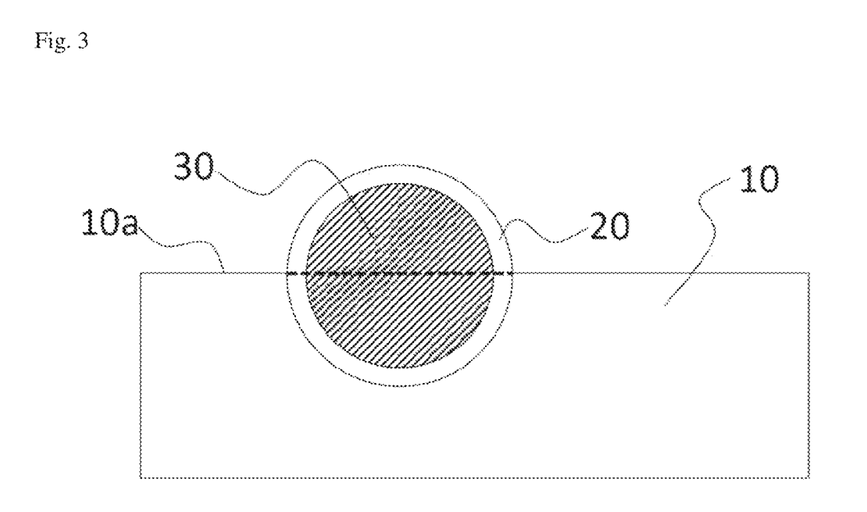
FIG. 3 is an image diagram showing a state in which a part of a hydrogen-generating particle protrudes from a hydrogen-generating layer (film).
Figure 4:
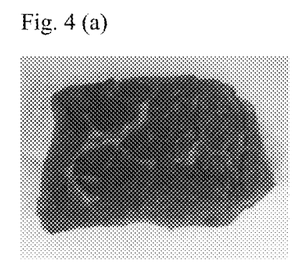

In the film of the present invention, preferably, at least the surface of the hydrogen-generating particles protruding outward from the surface of the film (hydrogen-generating layer) is covered with a coating layer containing a coating resin. FIG. 3 shows a schematic diagram of a cross-sectional structure of the hydrogen-generating particles protruding from the surface of the film of the present invention. As shown in FIG. 3, the hydrogen-generating particles 30 protrude from a surface 10a (particularly, the broken line part in FIG. 3) of the film (hydrogen-generating layer) and at least the protruding part is covered with the coating layer 20.

In FIG. 1, the hydrogen-generating particles 30 covered with the coating layer 20 are dispersed in the matrix 10. In this case, as long as hydrogen-generating particles jutted out from the surface of the film of the present invention be covered with a coating layer, for example, the surface of the hydrogen-generating particles completely embedded in the film of the present invention may not be necessarily covered with a coating layer. For example, the completely embedded hydrogen-generating particles 30 may be dispersed in direct contact with the matrix 10. In addition, the coating layer 20 may contain components constituting a matrix (for example, a polymer material for a matrix) as long as the profitable effects of the present invention are not impaired.

In this manner, in a structure in which almost all of the hydrogen-generating particles protruding from the surface of the hydrogen-generating layer are covered with a coating layer, when meat comes in contact with the surface of the hydrogen-generating layer, it is possible to effectively inhibit or prevent elution of components constituting the hydrogen-generating particles themselves into water (and the meat) while hydrogen is generated from the hydrogen-generating particles. In particular, according to the present invention obtained by the production method (to be described below) of the present invention, since the hydrogen-generating particles are covered with a coating layer in advance and then dispersed in a matrix, aggregation of the hydrogen-generating particles can be avoided and the hydrogen-generating particles can be uniformly distributed in the hydrogen-generating layer, and thus hydrogen can be generated more effectively.

FIG. 5 shows an embodiment in which the hydrogen-generating particles are not covered with a coating layer. In the film 1 of FIG. 5, the hydrogen-generating particles 30 that are not covered with a coating layer are dispersed in the matrix 10. That is, the hydrogen-generating particles 30 are dispersed in direct contact with the matrix 10. The hydrogen-generating particles may protrude from the surface of the film of the present invention as shown in FIG. 1 or may not protrude therefrom as shown in FIG. 5. As shown in FIG. 5, when the hydrogen-generating particles are not covered with a coating layer, it is possible to obtain more rapid hydrogen supply performance and the like.

In both of the forms of FIG. 1 and FIG. 5, as shown below, a film composed of a single hydrogen-generating layer can be used as the film of the present invention and also a laminate film comprising a hydrogen-generating layer and other layers and in which the hydrogen-generating layer is disposed as the outermost layer can be used as the film of the present invention.

Hereinafter, the configuration, characteristics and the like of the film of the present invention according to the embodiment will be described in more detail.

Hydrogen-Generating Layer

The film of the present invention has a hydrogen-generating layer containing hydrogen-generating particles. The number of hydrogen-generating layers may be one or two or more. The thickness of the hydrogen-generating layer can be appropriately set according to the type of meat to which it is applied and the like, and when the thickness is particularly in a range of 10 to 150 μm, not only it is suitable for wrapping meat but it is also possible to efficiently supply molecular hydrogen to meat without excess or deficiency.

The hydrogen-generating particles contained in the hydrogen-generating layer generate hydrogen (hydrogen gas) when the particles react with water, but the water supply source is not particularly limited. For example, it may be water exuded from meat or water on the surface of the meat. In addition, for example, it may be water in the atmosphere or water retained in the film. Preferably, it is water in the meat and/or on the surface of the meat. In this case, since the water source functions as a water source that generates molecular hydrogen upon reacting with the hydrogen-generating particles, compared to when water is added separately from water derived from the meat, it is possible to prevent excess mold from being generated due to excess water in the meat.

The hydrogen-generating particles are not limited as long as they generate hydrogen (hydrogen gas) by reacting with water, and examples thereof include metals alone such as magnesium or aluminum, or alloys containing at least one of them in addition to hydrogenated compounds such as magnesium hydride, calcium hydride, barium hydride, beryllium hydride, strontium hydride, lithium hydride, sodium hydride, sodium borohydride, lithium/sodium hydride, silicon hydride, or the like. These can be used alone or two or more thereof can be used in combination.

The size of the hydrogen-generating particles is not particularly limited, and for example, the hydrogen-generating particles having a volume average particle diameter of 1 to 100 μm are preferable. When the volume average particle diameter is less than 1 μm, the hydrogen-generating particles tend to aggregate with each other, and the dispersibility in the matrix may decrease. In addition, when the volume average particle diameter exceeds 100 μm, since the hydrogen-generating particles become heavy, there is a risk of the dispersibility in the matrix decreasing. Here, the volume average particle diameter of the hydrogen-generating particles is a value obtained by calculating an average particle diameter D50 (50% particle diameter) from the result of the volume cumulative particle size distribution of the hydrogen-generating particles (powder) measured by a laser diffraction method.

The content of the hydrogen-generating particles in the hydrogen-generating layer is not particularly limited, and can be appropriately set according to the type of hydrogen-generating particles used, a desired hydrogen generation amount, the type of meat used, and the like. For example, it can be set in the range of about 0.1 to 10 weight % (particularly 0.5 to 5 weight %), but the present invention is not limited thereto.

Coating Layer

In the film of the present invention, it is desirable that at least the surface of the hydrogen-generating particles protruding outward from the surface of the hydrogen-generating layer be covered with a coating layer containing a coating resin. As exemplified in FIG. 3, when the surface of the hydrogen-generating particles protruding from the surface of the hydrogen-generating layer is covered with a coating layer containing a coating resin, the hydrogen-generating particles can be fixed in a state that the particles are not exposed outside. The proportion of the coating resin in the coating layer is not particularly limited, and for example, it can be appropriately set within a range of about 80 to 100 weight % (particularly 90 to 100 weight %) in the coating layer.

The thickness of the coating layer is not particularly limited, and generally it is preferably appropriately set in a range of about 1 nm to 50 μm. Within the above range, it is possible to secure a sufficient hydrogen generation amount while fixing the hydrogen-generating particles more reliably.

The type of the coating resin is not particularly limited, and at least one selected from the group of a polyolefin resin and a polyamide resin can be suitably used. As the polyolefin resin, for example, polyethylene, polypropylene, and the like can be suitably used.

The proportion of the hydrogen-generating particles with respect to the coating layer is not limited, and for example, it can be appropriately set according to the type of hydrogen-generating particles used, the type of the coating resin, and the like. For example, the proportion of the hydrogen-generating particles can be set to about 1 to 100 parts by weight (particularly 2 to 50 parts by weight) with respect to 100 parts by weight of the coating layer, but the present invention is not limited thereto.

Matrix

The matrix preferably contains a polymer material. Therefore, it is possible to impart functions of reliably fixing the hydrogen-generating particles and allowing hydrogen generated from the hydrogen-generating particles to permeate through the matrix. The proportion of the polymer material in the matrix is not particularly limited, and for example, it can be appropriately set within a range of about 80 to 100 weight % (particularly 90 to 100 weight %) in the matrix.

Therefore, the polymer material is not particularly limited as long as it has the above functions. In addition, in this case, the polymer material may have a solid form (for example, a film) or a form having fluidity.

More specifically, as the polymer material, for example, in addition to polyolefin resins such as polyethylene and polypropylene, and a styrol resin, a vinyl chloride resin, polyester resins such as polyethylene terephthalate, polyamide resins (nylon, etc.), polyethylene glycol, starch, cellulose, polyethylene oxide and the like can be preferably used. These can be used alone or two or more thereof can be used in combination. In particular, the polymer material is preferably polyethylene because the dispersibility of the hydrogen-generating particles including a resin layer become favorable.

In particular, when the polymer material is used in the form of a wet coating agent (that is, when it is applied and used in the form of a solution or a dispersion liquid), for example, at least one of a urethane resin, a fluororesin, a modified fluororesin, a polyolefin resin, an epoxy resin, a polyester resin, a polyamide resin, a vinyl chloride resin, polyethylene glycol, and polyethylene oxide can be used. The solution or dispersion liquid may contain a solvent, a dispersing agent or the like.

In addition, the polymer material may be the same as or different from the coating resin. If the polymer material and the coating resin are the same as each other, higher adhesion can be obtained. As a result, it is possible to inhibit dropping out of the hydrogen-generating particles more effectively. On the other hand, when the polymer material and the coating resin are different from each other, for example, it is possible to control a water permeation speed and it is possible to control a hydrogen generation amount. Even if the polymer material and the coating resin are the same as each other, densities thereof and the like can be changed so that the hydrogen generation amount can be controlled.

Other Components

In the film of the present invention, in a range that does not substantially adversely affect the advantages of the present invention, as necessary, other components may be contained in the hydrogen-generating layer. For example, an enzyme, a coloring material, a preservative, an antioxidant, a UV absorbing agent or the like can be added.

In particular, as the enzyme, at least one selected from the group of a proteolytic enzyme and a proteolytic enzyme coenzyme can be suitably used. One function of aging meat is to decompose proteins in meat into amino acids such as glutamic acid and inosinic acid which are Umami components. Generally, such proteolysis is performed with proteolytic enzymes in microorganisms naturally attached to the surface of meat in addition to proteolytic enzymes inherent in cells of meat. More specifically, these proteins are decomposed into peptides with proteolytic enzymes (proteases). Next, peptides are decomposed into amino acids such as glutamic acid with various enzymes such as peptidase, or the like.

In addition, the presence of cofactors called coenzymes is essential for such enzymes. Generally, vitamins such as vitamin C act as coenzymes in living organisms. Various vitamins and magnesium are known as proteolytic enzyme coenzymes. However, since meat itself does not have the ability to produce new vitamins and vitamins decompose and decrease over time. Although there are vitamins derived from microorganisms, they are also used for survival of the microorganisms themselves and are decomposed, and thus vitamins as coenzymes used for proteolysis are deficient.

On the other hand, when the film of the present invention contains proteolytic enzymes and/or proteolytic enzyme coenzymes, the proteolytic enzymes and/or proteolytic enzyme coenzymes are supplied into meat, and aging of the meat proceeds more effectively.

Here, it is known that, for various enzymes such as proteolytic enzymes and peptidase, magnesium acts as a coenzyme. Unlike vitamins, magnesium itself does not decompose and can be repeatedly used as a coenzyme, and thus even if it is used in a very small amount, it can be used as a coenzyme for an enzyme reaction in which proteins are continuously decomposed into amino acids. In this regard, in the film of the present invention, magnesium or the like can be suitably used as a coenzyme for an enzyme which allows proteins to be decomposed into amino acids.

Magnesium as a coenzyme for an enzyme which allows proteins to be decomposed into amino acids is sufficient even in a very small amount, and even if a large amount of magnesium is attached to meat in a range in which the amount does not cause any harm to the human body and the like, since magnesium does not penetrate deep inside the meat, it can be easily removed by washing the surface of the meat with water.

As described above, when the proteolytic enzymes and/or proteolytic enzyme coenzymes are contained, since proteolysis with microorganisms attached to the surface of the meat is further promoted, the film of the present invention can be particularly preferably used for dry aging applications.

2. Use of Film for Preserving Meat

Form of Film

The film of the present invention is provided in the form of a single hydrogen-generating layer or in the form of a laminate film including the same. Therefore, for example, a laminate film which includes a hydrogen-generating layer and other layers and in which the hydrogen-generating layer is disposed as the outermost layer can be used. In the case of the laminate film, various layers (a printing layer, a protective layer, an adhesive layer (a heat sealing layer), a shrinkable film layer, etc.) can be appropriately laminated on one surface of the hydrogen-generating layer. In addition, the material of the layers to be laminated is not particularly limited, and for example, paper, a metal can, a metal plate, a metal foil, a metal vapor-deposited film, a non-woven fabric, cloth, a resin film or the like can be used alone or two or more thereof can be used in combination.

On the other hand, at least one surface of the hydrogen-generating layer is a surface that will be attached to meat. For the purpose of protecting the surface (attaching surface) and inhibiting hydrogen generation, a release film or the like can be temporarily laminated on the attaching surface before attaching (before use). As the release film itself, known films or commercially available films can be used.

In addition, the film of the present invention can be used as a flat film, but it may be molded into an embossing shape, a wavy shape or the like or formed into a container shape as necessary. In addition, the film can be foamed as necessary. That is, the film of the present invention can be used by appropriately changing its shape in accordance with an environment in which meat is aged and the like. Unlike a sheet containing microorganisms, when the film of the present invention is molded, processed, and the like, since no microorganisms are added to the film of the present invention, performance does not significantly change depending on the temperature or atmosphere conditions during molding.

Embodiment of Using the Film (A) Aging Method (Method of Producing Aged Meat)

The film of the present invention can be used for aging meat. Examples of aging include a) generating Umami components according to proteolysis of meat and b) softening the meat, and the aging in the present invention refers to at least one of the above a) and/or b).

The meat is not particularly limited as long as it can be aged, and examples thereof include animal raw meat such as beef, pork, poultry, and fish, and processed products thereof (ham, sausage, etc.).

Generally, a sheet that wraps the meat (including not only covering the entire meat but also covering a part thereof) when the meat is aged is also called an aging sheet. The film of the present invention can be used as an aging sheet used for wet aging or dry aging. In particular, when the film of the present invention is used for wet aging, putrefaction is inhibited and water in the meat can react with the hydrogen-generating particles in the film of the present invention, and thus molecular hydrogen can be easily generated, and the molecular hydrogen can be efficiently supplied to the meat. In this regard, the film of the present invention is preferably used for wet aging.

A specific aging method is not limited, and particularly, the following method is desirable. A method of producing aged meat including (1) a step of attaching a film of the present invention to meat so that a hydrogen-generating layer of the film is in direct contact with the surface of the meat (attaching process) and (2) a step of aging the meat to which the film is attached at a temperature of 5° C. or lower to obtain aged meat (aging process) can be preferably used.

Attaching Process

In the attaching process, the film of the present invention is affixed to the meat so that the hydrogen-generating layer is in direct contact with the surface of the meat. The attaching referred to here may have a form in which the film of the present invention is fixed (affixed) to the surface of the meat such that it is not peeled off from the surface of the meat in the aging process described blow. For example, it may have a form in which the film is stuck with water or a form in which the film is fixed by compression due to a reduced pressure inside a sealed bag body, for example, a vacuum pack, a retort pack, or a pouch pack.

In the attaching process, the meat can be also adhered to both surfaces of the hydrogen-generating layer. For example, the film of the present invention can be used so that the meat (for example, two pieces of the meat) is laminated on both surfaces of a) a film composed of a single hydrogen-generating layer, b) a film composed of a hydrogen-generating layer/a base layer/a hydrogen-generating layer, or c) a film composed of a hydrogen-generating layer/a hydrogen-generating layer. In this manner, when the film of the present invention is adhered such that it is interposed between the pieces of meat, many pieces of meat can be aged at the same time in a limited space. As described above, two or more hydrogen-generating layers may be laminated. In addition, as the base layer, at least one selected from the group of a synthetic resin layer, paper, a metal can, a metal plate, a metal foil, a metal vapor-deposited film, a non-woven fabric, cloth, and the like can be employed.

An area for attaching may be a part of the surface of the meat or the entire surface of the meat. When the film is attached to a part of the surface of the meat, any of a method of attaching the film of the present invention to a part of the surface of the meat and a method of disposing the film of the present invention and placing the meat thereon may be used. When the film is adhered to the entire surface of the meat, any of a method of wrapping the circumference of the meat with the film of the present invention and a method of molding the film of the present invention into a bag shape and packaging the meat can be used. In the present invention, in order to further promote aging, it is preferable to adhere the film to the whole surface (the entire surface) of the meat. Here, during adhering, the entire surface of the film of the present invention may be completely in contact with the surface of the meat or a non-contact area may exist as long as the advantageous effects of the present invention are not impaired.

Accordingly, the size of the film of the present invention can be appropriately adjusted according to the size, shape, and the like of the area for attaching. The size, shape, and the like of the film of the present invention can be appropriately adjusted by cutting with a known or commercially available cutting machine, for example, scissors or a cutter.

Aging Process

In the aging process, the meat to which the film is adhered is aged at a temperature of 5° C. or lower to obtain aged meat.

The meat to which the film of the present invention is affixed is aged at a temperature of 5° C. or lower (particularly 0° C. to 4° C.), The aging time can be appropriately set according to a desired maturation, the type of meat used and the like. Generally, the time can be about 1 to 14 days, but the present invention is not limited thereto.

In addition, the aging atmosphere is not particularly limited, and it is preferably an atmosphere in which the outside air is blocked in order to obtain effects of molecular hydrogen (hydrogen gas) more reliably. For example, the meat to which the film of the present invention is adhered preferably remains under a vacuum or a reduced pressure. Thus, for example, the meat to which the film of the present invention is attached can be aged by packaging it in a vacuum pack.

During aging, water reacts with the hydrogen-generating particles and generates molecular hydrogen, which helps effective aging. In this case, water that reacts with the hydrogen-generating particles may be water contained in the meat (water exuded from the meat) but the present invention is not limited thereto. For example, the water may be water adhered to the surface of the meat, water in the atmosphere, or water retained in the film of the present invention. In particular, as to a water source, water in the meat or on the surface of the meat reacts with hydrogen-generating particles to make molecular hydrogen is preferable. When water is supplied from the outside, mold and the like easily grow due to excess water. In contrast, hydrogen can be generated without supplying water from the outside, and thus it is possible to effectively avoid a risk of mold growth.

After the aging process is completed, the aged meat after removing the film of the present invention may be distributed or the aged meat together with the film of the present invention may be provided. That is, since the film of the present invention is used not only for aging but also has an antiseptic effect due to molecular hydrogen and water absorption effect and the like secondarily, it can contribute to preserving a certain degree of freshness. Thus, the adhered film of the present invention may remain until the meat is eaten after the aging process.

(B) Freshness Preservation Method (Method of Producing Meat with Preserved Freshness)

The film of the present invention can be used to maintain the freshness of the meat. In particular, it can be used to maintain the color of the meat and/or inhibit fat oxidation. More specifically, the film of the present invention can effectively inhibit browning of the color (particularly red) of the fresh meat over time and oxidation of fat content and the like. Thereby, it is also possible to provide meat in which the color or flavor of the fresh meat is substantially maintained.

When the film of the present invention is used to preserve freshness, for example, the meat itself may be aged or may not be aged as long as it is possible to maintain the color of the meat (particularly an exposed surface of the meat), an acid value of fats of the meat, and the like. Therefore, the use of the film of the present invention under conditions in which the meat is not aged will function exclusively for preserving freshness. For example of preserving freshness, the film of the present invention can be used for a short time.

A specific freshness preservation method is not limited, and particularly, the following method is desirable. A method of preserving the freshness of meat including (1) a process in which the film of the present invention is attached to meat so that the hydrogen-generating layer is in direct contact with the surface of the meat (attaching process) and (2) a process in which the meat to which the film is attached is preserved for a certain time (preserving process) can be suitably used.

Attaching Process

In the attaching process, the film of the present invention is affixed to the meat so that the hydrogen-generating layer is in direct contact with the surface of the meat. The attaching referred to here may have a form in which the film of the present invention is fixed (attached) to the surface of the meat such that it is not peeled off from the surface of the meat during preservation, and for example, it may have a form in which the film is stuck with water or a form in which the film is fixed by compression due to a reduced pressure inside a sealed bag body such as a vacuum pack, a retort pack, or a pouch pack.

In the attaching process, the meat can be stuck to both surfaces of the hydrogen-generating layer. For example, the film of the present invention can be used such that the meat (for example, two pieces of the meat) is laminated on both surfaces of a) a film composed of a single hydrogen-generating layer, b) a film composed of a hydrogen-generating layer/a base layer/a hydrogen-generating layer, or c) a film composed of a hydrogen-generating layer/a hydrogen-generating layer. In this manner, when the film of the present invention is affixed such that it is interposed between the pieces of meat, it is possible to preserve the freshness of many pieces of meat at the same time in a limited space. As described above, two or more hydrogen-generating layers may be laminated. In addition, as the base layer, at least one selected from the group of a synthetic resin layer, paper, a metal can, a metal plate, a metal foil, a metal vapor-deposited film, a non-woven fabric, cloth, and the like can be used.

An area for attaching may be a part of the surface of the meat or the entire surface of the meat. When the film is adhered to a part of the surface of the meat, any of a method of attaching the film of the present invention to a part of the surface of the meat and a method of disposing the film of the present invention and placing the meat thereon may be used. When the film is attached to a part of the surface of the meat, it is preferable to attach the film of the present invention to an area including the cut end (cross section) when the meat is processed. On the other hand, when the film is adhered to the entire surface of the meat, any of a method of wrapping the whole circumference of the meat with the film of the present invention and a method of molding the film of the present invention into a bag shape and packaging the meat can be used in the bag. In the present invention, for example, in order to effectively prevent the color of the entire meat from changing, it is preferable to adhere the film to the whole surface (the entire surface) of the meat. Here, during adhering, the entire surface of the film of the present invention may be completely in contact with the surface of the meat or a non-contact area between the film and the meat may exist so as to not adversely affect the advantages of the present invention.

Therefore, the size of the film of the present invention can be appropriately adjusted according to the size, shape, and the like of the area for attaching. The size, shape, and the like of the film of the present invention can be appropriately changed by cutting with a known or commercially available cutting machine, for example, scissors or a cutter.

Preserving Process

In the preserving process, the meat to which the film is adhered is preserved for a certain time. Preservation conditions depend on, for example, the type of meat, the necessity of aging, and the like, but generally the temperature may be about −50° C. to 50° C. (particularly −30° C. to 30° C.), and the time may be in a range of about 30 minutes to 24 hours (particularly 1 hour to 20 hours), and the present invention is not limited thereto.

During preservation, in order to more reliably exhibit a freshness preservation effect of the film of the present invention, the meat to which the film of the present invention is adhered preferably remains in a state in which the outside air (atmosphere) is blocked. In view of that, for example, 1) a method in which the meat is packaged with the film of the present invention so that the hydrogen-generating layer is in direct contact with the surface of the meat, and the meat is sealed and preserved, 2) a method in which the meat to which the film of the present invention is adhered is directly preserved in a sealed container, or the like can be suitably used. The inside of the sealed space or enclosed space may be in a vacuum or may be filled with an inert gas such as nitrogen gas.

3. Method of Producing Film for Preserving Meat

A method of producing a film for preserving meat of the present embodiment includes a process in which the hydrogen-generating particles capable of generating molecular hydrogen upon reacting with water are dispersed in the polymer matrix. A method of dispersing the hydrogen-generating particles in the polymer matrix is not particularly limited, and for example, a method in which the hydrogen-generating particles are mixed and stirred in a liquid matrix polymer, a method in which the hydrogen-generating particles are applied or sprayed to a matrix polymer, or the like can be employed.

In particular, the film of the present invention can be suitably obtained by, for example, the following production method. According to a method of producing a film for preserving meat that generates hydrogen when it comes in contact with water, comprising (1) a step of preparing a mixture containing a) hydrogen-generating particles that can generate hydrogen upon reacting with water and b) a coating resin is prepared (first process) and (2) a step of mixing the mixture with a matrix polymer material (second process), the film of the present invention can be suitably produced. Therefore, in the present invention, in particular, the film of the present invention obtained by the production method can also be suitably used.

First Process

In the first process, a mixture containing a) the hydrogen-generating particles that can generate hydrogen upon reacting with water and b) a coating resin is prepared.

The form of the mixture may be, for example, any of a compound form in which a plurality of hydrogen-generating particles are contained in a coating resin or a form of composite particles in which the surface of one hydrogen-generating particle is covered with a coating resin.

Accordingly, in the first process, a method to be performed may be selected according to the form of the composite particle. In this case, for example, the type of hydrogen-generating particles, the type and addition amount of the coating resin, and the like may be set according to the details described in the above "1. Film for preserving meat".

When a compound is prepared as the mixture, for example, i) a method in which hydrogen-generating particles and a molten coating resin are kneaded, ii) a method in which a mixture containing a molten coating resin and hydrogen-generating particles is sprayed, or the like can be used.

In addition, when composite particles in which the surface of one hydrogen-generating particle is covered with a coating resin are prepared as a mixture, for example, a method of spraying a coating resin on the hydrogen-generating particles under stirred to cover the particles with the coating resin or the like can be used.

Second Process

In the second process, the mixture is mixed with the matrix polymer material. Thereby, the hydrogen-generating particles are dispersed in the matrix polymer material.

As the matrix polymer material, various polymer materials exemplified above can be used.

The mixing method is not particularly limited, and for example i) a method in which composite particles or compounds are mixed and stirred with a liquid matrix polymer material (molten mixture), ii) a method in which a kneaded mixture of hydrogen-generating particles and a coating resin and a matrix polymer material are co-extruded to prepare a film containing the hydrogen-generating particles whose surface is covered with a coating resin that are dispersed in the matrix polymer material to form a film, iii) a method in which composite particles are applied or sprayed to the molten matrix polymer material, as if the hydrogen-generating particles and the coating resin are in an emulsion state, iii) a method in which composite particles are applied or sprayed to the molten matrix polymer material or the like can be used. In addition, when the hydrogen-generating particles and the coating resin which are in an emulsion state are dispersed in the matrix polymer material, the first process and the second process can be performed substantially at the same time.

Here, as described above, in the second process, molding (molding into a film) may be performed at the same time, but the mixture obtained in the second process can be additionally subjected to a molding process. The molding method may be the same method used when a known resin composition is molded. For example, various methods such as an extrusion molding method, an inflation molding method, a blow molding method, and a calendering method can be used.

EXAMPLES

Examples and comparative examples will be shown below, and features of the present invention will be described in more detail. However, the scope of the present invention is not limited to the examples.

Example 1

A commercially available magnesium hydride powder (from Wako Pure Chemical Industries, Ltd., volume average particle diameter D50: 15 μm) was kneaded in a molten state with a commercially available polyethylene resin molten at 180° C. to produce a magnesium hydride-containing compound. The proportion of the polyethylene resin was 95 weight %, and the proportion of the magnesium hydride powder was 5 weight %, for a total of 100 weight %.

1 part by weight of the magnesium hydride-containing compound and 4 parts by weight of the commercially available polyethylene resin that were sufficiently mixed were formed into a film having a thickness of 100 μm by a melting extrusion molding method. Thereby, as shown in FIG. 1, the film for aging meat 1 composed of single hydrogen-generating layer in which the magnesium particles covered with a coating resin 20 as hydrogen-generating particles 30 were dispersed in the matrix (polyethylene resin) 10 was obtained (the content of the magnesium hydride powder in the hydrogen-generating layer was 1 weight %).

Next, the sheet for aging meat was cut to 10 cm×10 cm, and 1 kg of a commercially available block-like beef rib with one side (5 cm×10 cm) was prepared as meat. The film for aging meat was placed thereon and brought into direct contact therewith, and the entire sample was additionally covered with a commercially available aluminum foil (commercially available from Toyo Aluminium Ekco Products Co., Ltd.) and refrigerated at 4° C. for 7 days. Thus, the meat was subjected to simple wet aging and thus aged meat was obtained. A 1 cm² red meat part with a depth of 5 mm was cut out from the surface of the aged meat and homogenized with a commercially available homogenizer, amino acids were extracted from the meat using a sulfosalicylic acid solution, and the amount of glutamic acid was measured by a known amino acid analysis method. As a result, the amount of glutamic acid was 40 mg/100 g (the amount of glutamic acid contained in 100 g of meat).

Here, the amount of glutamic acid when the meat was purchased was measured in advance according to the same procedure as above, and the amount of glutamic acid was 19 mg. That is, the amount of glutamic acid of the aged meat was doubled compared with that before the aging.

Next, the acid value of fatty acids was measured. When 100 g of the rest of the aged meat was dissolved in a mixed solvent of ethanol and diethyl ether, and measurement was performed by a known neutralization titration method using a potassium hydroxide standard solution, the acid value after aging was 0.32. For example, since the acid value was preferably less than 0.5 for edible oil, the acid value can be said to be a value that does not cause any problem for edible use.

In addition, panelists confirmed whether there was ammonia odor when the aged meat was left at room temperature (a temperature of 25° C. and a humidity of 40%) for 36 hours. No ammonia odor was confirmed in the meat before it was left at room temperature, and there was no particular change even after it was left at room temperature.

Example 2

A film was produced in the same manner as in Example 1 except that the content of the magnesium hydride powder in the hydrogen-generating layer of the film for aging meat was changed to 5 weight %, and aged meat was obtained in the same manner as in Example 1. Next, the amount of glutamic acid, the acid value and the presence of ammonia odor were measured in the same manner as in Example 1. As a result, the amount of glutamic acid increased to 40 g/100 g, the acid value was 0.32, and no ammonia odor was confirmed.

Example 3

A film was produced in the same manner as in Example 1 except that a resin used for the film for aging meat was changed from a polyethylene resin to a polypropylene resin, and aged meat was obtained in the same manner as in Example 1. Next, the amount of glutamic acid, the acid value and the presence of ammonia odor were measured in the same manner as in Example 1. As a result, the amount of glutamic acid increased to 40 g/100 g, the acid value was 0.32, and no ammonia odor was confirmed.

Example 4

A sheet was produced in the same manner as in Example 1 except that the content of magnesium hydride in the hydrogen-generating layer of the film for aging meat was changed to 3 weight %, and aged meat was obtained in the same manner as in Example 1. Next, the amount of glutamic acid, the acid value and the presence of ammonia odor were measured in the same manner as in Example 1. As a result, the amount of glutamic acid increased to 40 g/100 g, the acid value was 0.32, and no ammonia odor was confirmed.

Example 5

A commercially available magnesium hydride powder (from Wako Pure Chemical Industries, Ltd., volume average particle diameter D50: 15 μm) was kneaded in a molten state with a commercially available polyethylene resin molten at 180° C. to produce a magnesium hydride-containing compound. The proportion of the polyethylene resin was 97 weight %, and the proportion of the magnesium hydride powder was 3 weight %, for a total of 100 weight %.

Figure 6:
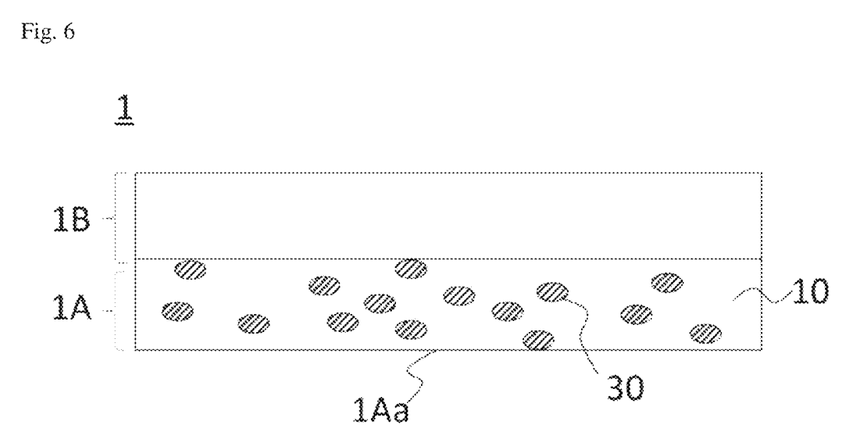
FIG. 6 is an image diagram of a cross-sectional structure of a film for preserving meat produced in Example 5.

The obtained magnesium hydride-containing compound was co-extruded by a melting extrusion molding method to form a laminate film including a hydrogen-generating particle-containing layer having a thickness of 40 μm and a layer having a thickness of 30 μm, and thus the film for aging meat 1 as shown in FIG. 6 was obtained. The film 1 of FIG. 6 had a structure in which a polyethylene layer 1B was laminated on a hydrogen-generating layer 1A. In the hydrogen-generating layer 1A, hydrogen-generating particles 30 having no coating layer were dispersed in the matrix 10 and the hydrogen-generating layer 1A was exposed. Then, an exposed surface 1Aa surface of the exposed hydrogen-generating layer 1A was set as a surface in contact with meat.

Next, aged meat was obtained in the same manner as in Example 1 except that a commercially available beef loin for steak was used in place of the block-like beef rib of Example 1 and the aging period was set to 4° C.×21 days. Next, when the amount of peptides was measured using a Protein Assay Lowry kit (commercially available from Nacalai Tesque, Inc.), the amount of inosinic acid was measured using amino acid analysis HPLC, and fragrance component inspection was performed by a dynamic headspace method, per 100 g of beef, the amount of peptides was 146.5 mg, the amount of inosinic acid was 13.8 mg, and the amount of methyl mercaptan and methylthiocinate in the fragrance was 0%.

Comparative Example 1

Aging was carried out in the same manner as in Example 1 except that a commercially available polyvinylidene chloride film ("Saran Wrap" (registered trademark) commercially available from Asahi Kasei Chemicals) was used in place of the polyethylene resin and aged meat was obtained. Next, the amount of glutamic acid, the acid value and the presence of ammonia odor were measured in the same manner as in Example 1. As a result, although the amount of glutamic acid slightly increased to 29 g/100 g, the acid value was high at 1.59, and ammonia odor was detected.

Comparative Example 2

Aged meat was obtained in the same manner as in Example 1 except that no film for aging meat was used and the meat was exposed to the outside air. Next, the amount of glutamic acid, the acid value, and the presence of ammonia odor were confirmed in the same manner as in Example 1. As a result, although the amount of glutamic acid increased to 29 g/100 g, the acid value was high at 3.5, and ammonia odor was detected.

Comparative Example 3

A film was produced in the same manner as in Example 1 except that only magnesium hydroxide powder was used in place of magnesium hydride powder and aged meat was obtained in the same manner as in Example 1. Next, the amount of glutamic acid, the acid value and the presence of ammonia odor were measured in the same manner as in Example 1. As a result, the amount of glutamic acid was 10 mg/100 g, the acid value was high at 2.39, and ammonia odor was detected.

Comparative Example 4

A commercially available aged beef block was prepared, a commercially available polyethylene film with a thickness of 10 μm, a length of 10 cm and a width of 10 cm was placed thereon and left at room temperature for 2 hours, and microorganisms were attached to the polyethylene film. Then, a commercially available DMEM culture medium was sprayed thinly on the surface of the film to which microorganisms were attached, the film was left in a $CO_2$ incubator for 72 hours, microorganisms grew on the polyethylene film, and a sheet for aging meat to which microorganisms were attached was produced. Next, the surface of the sheet for aging meat to which microorganisms were attached was brought into contact with a commercially available block-like beef rib and thereby aged meat was obtained in the same manner as in Example 1. Next, the amount of glutamic acid, the acid value and the presence of ammonia odor of the aged meat were confirmed in the same manner as in Example 1. As a result, although the amount of glutamic acid increased to 40 mg, the acid value was high at 1.52, and ammonia odor was confirmed.

Comparative Example 5

A sheet was produced in the same manner as in Example 1 except that the amount of magnesium hydride in the film for aging meat was changed to 0.01 weight %, and aged meat was obtained in the same manner as in Example 1. Next, the amount of glutamic acid, the acid value and the presence of ammonia odor were checked in the same manner as in Example 1. As a result, the amount of glutamic acid was 10 mg/100 g, the acid value was high at 2.39, and ammonia odor was detected.

Comparative Example 6

Aging was performed in the same manner as in Example 1 except that a commercially available polyvinylidene chloride film ("Saran Wrap" (registered trademark) commercially available from Asahi Kasei Chemicals) was used, a commercially available beef loin for steak was used in place of the block-like beef rib, and the aging period was set to 4° C.×21 days, and aged meat was obtained. When the amount of peptides and the amount of inosinic acid were measured and fragrance component inspection was performed in the same manner as in Example 5, per 100 g of beef, the amount of peptides was 112.7 mg, the amount of inosinic acid was 5.0 mg, and the amount of methyl mercaptan and methylthiocinate in the fragrance was 13%.

Test Example 1

The freshness preservation effect (color maintaining effect) in each of the above examples and comparative examples was evaluated. Aging was performed in the same manner as in the examples and comparative examples except that each film was similarly applied to one side (10 cm×10 cm) of a commercially available beef loin 200 g for steak in place of 1 kg of block-like beef rib in the examples and comparative examples. The color of the obtained meat after aging was observed.

As a result, the meat pieces obtained in the examples maintained a bright red that was almost the same as that when they were purchased. On the other hand, all of the aged meats of the comparative examples were brown. These observation results (pictures) are shown in FIG. 4(a)—(i).

Test Example 2

In Test Example 1, the hardness (texture) of the aged meat under the same conditions as in Example 1 and the aged meat under the same conditions as in Comparative Example 1 was calculated according to a Warner-Bratzler shear force, a Warner Bratzler shear force measurement jig was installed in a tensipresser (MyBoy2 commercially available from Taketomo Electric Inc.), the meat was set thereon, and measurement was performed. As a result, it was found that the texture of the aged meat under the same conditions as in Example 1 was 2530 gw, the texture of the aged meat under the same conditions as in Comparative Example 1 was 3360 gw, and the meat quality was softened by the film for preserving meat of the present invention.

As is clear from the above results, it can be understood that, when the film of the present invention is used, it is possible to inhibit deterioration of meat and promote aging of the meat. In particular, it can be understood that, with the film of the present invention, even when meat is aged, it is possible to effectively inhibit the change (browning) in the color and fat oxidation, and thus the film of the present invention is useful for preserving freshness.

INDUSTRIAL APPLICABILITY

The sheet of the present invention can be widely used for aging meat from industrial scale to home scale. More specifically, the sheet of the present invention can be suitably used as a sheet material in direct contact with meat, for example, like an aging sheet, a packaging material, a Dracula mat (name of product), a drip sheet, or the like. In addition, regardless of whether aging is performed, since it is also possible to effectively inhibit the change in the color of meat that occurs or the increase of the acid value that may occur over time, the sheet can be effectively used as a film for preserving the freshness in this regard.

The invention claimed is:

1. A film for preserving meat, wherein
   (1) the film includes a hydrogen-generating layer containing hydrogen-generating particles capable of generating molecular hydrogen upon reacting with water,
   (2) the film is used such that the hydrogen-generating layer is in direct contact with a surface of meat
   (3) the hydrogen-generating particle is covered with a coating layer containing a coating resin
   (4) the hydrogen-generating layer has a structure in which the hydrogen-generating particles are dispersed in a matrix containing a polymer material,
   (5) the content of the hydrogen-generating particles in the hydrogen-generating layer is 0.1 to 10 weight %, and
   (6) the thickness of the hydrogen-generating layer is 10 to 150 μm.

2. The film for preserving meat according to claim 1, wherein
   (1) the film comprises hydrogen-generating particles protruding outward from the surface of the hydrogen-generating layer, and
   (2) at least the surface of hydrogen-generating particles protruding outward from the surface of the hydrogen-generating layer is covered with a coating layer containing a coating resin.

3. The film for preserving meat according to claim 1, wherein
   the polymer material is at least one selected from the group of polyethylene, polypropylene, a styrol resin, a vinyl chloride resin, polyethylene terephthalate, a polyamide resin, a urethane resin, a fluororesin, a modified fluororesin, an epoxy resin, starch, cellulose, nylon, polyethylene glycol, and polyethylene oxide.

4. The film for preserving meat according to claim 1, wherein
   the hydrogen-generating particles are at least one selected from the group of magnesium hydride, calcium hydride, barium hydride, beryllium hydride, strontium hydride, lithium hydride, sodium hydride, sodium borohydride, lithium/sodium hydride, silicon hydride, magnesium, aluminum, a magnesium alloy, and an aluminum alloy.

5. The film for preserving meat according to claim 1, wherein
   the volume average particle diameter of the hydrogen-generating particles is 1 to 100 μm.

6. The film for preserving meat according to claim 2, wherein
   the volume average particle diameter of the hydrogen-generating particles is 1 to 100 μm.

7. The film for preserving meat according to claim 3, wherein
   the volume average particle diameter of the hydrogen-generating particles is 1 to 100 μm.

8. The film for preserving meat according to claim 4, wherein
   the volume average particle diameter of the hydrogen-generating particles is 1 to 100 μm.

9. A method of producing aged meat, comprising
   (1) a step of attaching the film for preserving meat according to claim 1 to the meat such that a hydrogen-generating layer of the film is in direct contact with a surface of the meat; and
   (2) a step of aging the meat to which the film is attached at a temperature of 5° C. or lower to obtain aged meat.

10. The production method according to claim 9, wherein at least the step (2) is performed in an atmosphere in which the outside air is blocked.

* * * * *